(12) United States Patent
Hansen et al.

(10) Patent No.: US 6,438,071 B1
(45) Date of Patent: Aug. 20, 2002

(54) METHOD FOR PRODUCING A 3D IMAGE

(75) Inventors: Rolf Kahrs Hansen; Poul Arndt Andersen, both of Flaktveit (NO)

(73) Assignee: Omnitech A.S. (NO)

( * ) Notice: Subject to any disclaimer, the term of this patent is extended or adjusted under 35 U.S.C. 154(b) by 0 days.

(21) Appl. No.: 09/701,262
(22) PCT Filed: Jun. 1, 1999
(86) PCT No.: PCT/NO99/00176
§ 371 (c)(1),
(2), (4) Date: Nov. 27, 2000
(87) PCT Pub. No.: WO99/66343
PCT Pub. Date: Dec. 23, 1999

(30) Foreign Application Priority Data

Jun. 19, 1998 (NO) .......................... 1998.2891

(51) Int. Cl.⁷ ............................ G01S 7/52; G01S 15/89
(52) U.S. Cl. ............................................ 367/88
(58) Field of Search ....................... 367/88, 11

(56) References Cited

U.S. PATENT DOCUMENTS 5,200,931 A   4/1993   Kosalos et al.
5,699,318 A * 12/1997   Fischer ...................... 367/88

* cited by examiner

Primary Examiner—Daniel T. Pihulic
(74) Attorney, Agent, or Firm—Rothwell, Figg, Ernst & Manbeck

(57) ABSTRACT

Method for producing an image of a submerged object (3), e.g. a shipwreck or the sea bottom, comprising the steps of emitting acoustic waves from a first transducer toward a first chosen volume (2), receiving acoustic waves reflected from said volume, the receiver (4) including a two-dimensional array of acoustic sensors being capable of measuring the phase and amplitude of the received waves, from the measured phase and amplitudes calculating the direction of the reflected waves, detecting the maximum amplitude or amplitudes of the waves received from each angular segment and the distance to the reflecting object, the combination of directions of the reflected waves and distances providing a three-dimensional model of said volume, emitting acoustic waves toward a second volume (6) at least partially overlapping said first volume, and repeating steps described above, detecting at least one common feature (3) in the overlapping parts (7) of the measured volume (2, 6) and combining said models by adjusting the relative position(s) and size(s) of said feature(s) for generating a three-dimensional image based on the combination of said models.

12 Claims, 2 Drawing Sheets

METHOD FOR PRODUCING A 3D IMAGE

This invention relates to a method for producing an image of a submerged object, e.g. a shipwreck or the sea bottom.

Acoustic sensors have become increasingly more common in systems for underwater sensing and imaging. Sonars are often used, ranging from simple systems detecting echos of an emitted pulse, to side scan sonars or two-dimensional multibeam sonar systems emitting and receiving signals along a line within a chosen angle and three-dimensional acoustic cameras, such as described in the articles "3D ACOUSTIC CAMERA FOR UNDERWATER IMAGING" by Rolf Kahrs Hansen and Poul Arndt Andersen in Acoustical Imaging, vol. 20, Plenum Press, New York, 1993, and "A 3D UNDERWATER ACOUSTIC CAMERA-PROPERTIES AND APPLICATIONS" by R. K. Hansen and P. A. Andersen in Acoustical Imaging, vol. 22, Plenum Press, New York, 1996.

In imaging larger objects the two-dimensional sonar is normally used by moving the sonar over e.g. the sea bottom and scanning at an angle essentially perpendicular to the direction of the movement. The data sampled along each line are combined to provide a segmented picture of the sea floor. A problem inherent in this solution is the difficulties in controlling the exact position of the sensor. A sonar unit being moved over the sea bottom is subject to drift because of current, wind, and if the sonar is carried by a boat, and inaccuracies in the control system of the vessel.

It is an object of this invention to provide a method for generating an image of the sea floor or under water objects using a 3D acoustic imaging system.

It is also an object of this invention to provide a method for generating a composite image of underwater structures being compensated for variations in the position or the movement of the acoustic transducers.

These objects of the invention are obtained using a method according to claim 1.

The advantageous features of the invention related to the use of a 3D acoustic transducer system are thus that each 3D segment contains data being virtually insensitive to movements of the recording transducer unit, that the 3D segments have been combined in order to provide a larger 3D image.

Another advantageous feature is that the 3D segments have a coordinate accuracy which is better than the accuracy of the position measurement system, due to corrections based upon the information content in the separate 3D image elements.

Yet another advantageous feature of this invention is that each underwater object, due to the overlapping images, are insonified several times, from different angles of incidence. If one angle of incidence does not cause reflected energy to be transmitted back to the transducer unit, the next angle of incidence might, thus providing a 3D image of the objects to a certain degree comprising views if the inside or back side of the objects. Therefore, much more detail will be available in the combined image than in one separate 3D image, or images composed of measurements from side scan sonars.

The invention is described below with reference to the accompanying drawings, which by way of example illustrates the invention.

Figure 1:
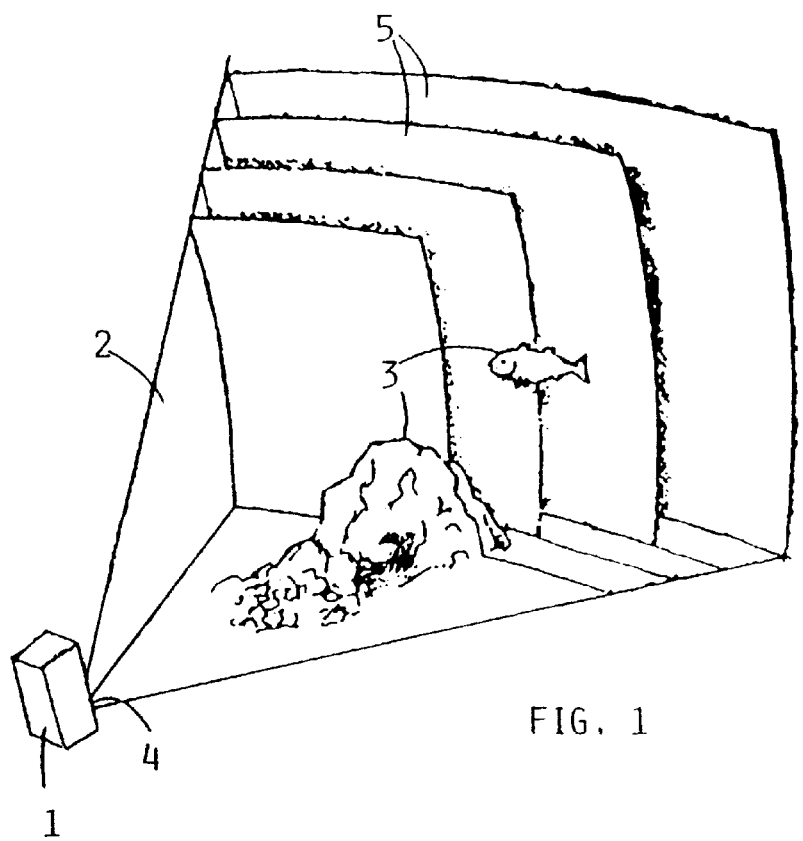
FIG. 1 illustrates the use of an acoustic 3D transducer unit for providing a 3D image.

The camera 1 in FIG. 1 emits a number of pulses toward a selected volume 2. The pulses are reflected by different objects 3 and the receiver is capable of receiving the reflected pulses at a number of different sensors in a sensor matrix 4.

Figure 2:
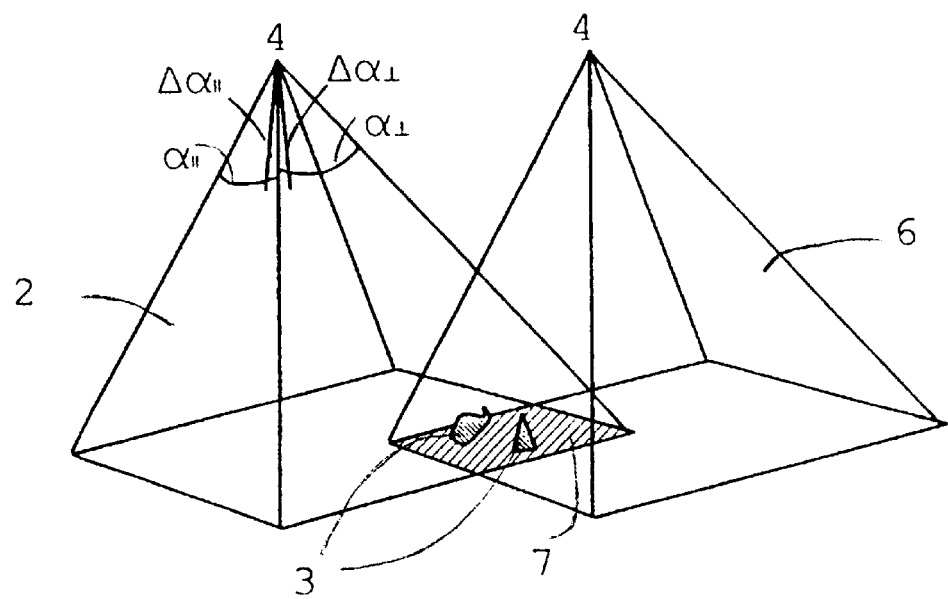
FIG. 2 illustrates two partially overlapping areas.

The sensors are capable of sensing the phase, time and amplitude of the received signal from a chosen angular sector defined by $\alpha_1$ and $\alpha_2$ (see FIG. 2). Comprised in the transducer unit 1 is also computing means for, based on the measurements of each sensor, calculating the direction, strength and time of arrival for the reflected waves.

The signal received from each direction, defined by the angular segments $\Delta\alpha_1$ and $\Delta\alpha_2$ included $\alpha_1$ and $\alpha_2$, respectively, is analysed to detect the arrival of the peak amplitude or amplitudes of the signals received within the angular segment. The time of arrival of the peak amplitude indicates distance to the object. Thus, a composite image may be obtained from the direction of the received signal and the distance to the reflected object within each angular segment, as is indicated in FIG. 1 where the measured volume comprises a number of planes 5 referring to different distances from the sensor array 4.

By detecting more than one peak amplitude within each angular segment two or more reflecting objects at different distances may in some cases be found, increasing the three-dimensional image. This may be also indicate that the closest reflecting object is small, occupying only a part of the segment, having e.g. a hole transmitting part of the emitted pulse, or be partially transparent in the frequency range of the emitted acoustic signal.

The methods for calculating these parameters are well known and will not be described in detail here. The computing is preferably performed using computer programs, implemented in hardware or software, inside the transducer unit. It may, however, also be performed later, or the received signals may be transmitted through a cable to a computer e.g. on board a control vessel steering the transducer unit.

We refer now to FIG. 2. Having registered a first image 2 the process may be repeated producing a second acoustic image 6 at least partially overlapping the first image. By analysing the two images certain common features 3 in the common volume 7 may be found, e.g. an object protruding towards the transducer. Assuming that the features 3 are stationary the scale and relative positions of the images may be adjusted to provide a unitary three-dimensional image from the two images. This way any errors due to variations in the position or movement of the transducer unit may be reduced or eliminated.

Preferably three or more common features 3 are used when combining the images, thus reducing the chances of error if one of the chosen features turns out to be moving.

The abovementioned features may be chosen manually or, preferably, automatically using available mathematical methods of any suitable type, e.g. by detecting the minimum distances in the overlapping parts of the images.

According to a preferred embodiment of the invention the combination of two or more images uses the following characteristics of the acoustic image:

As the image is three-dimensional it is represented by its x, y, and z coordinates, as well as the intensity representing the acoustic target strength of the reflecting object or part of object.

As each point represents the maximum intensity along the beam in an angular segment $\Delta\alpha_1$ and $\Delta\alpha_2$, each point will map one-to-one onto a plane parallel to the two-dimensional receiving transducer array. This projection is called the lateral projection.

The three-dimensional image produced by a single acoustic pulse has a time tag which is applied to all the points in the image. This three-dimensional image is called a 3D image element.

Figure 3:
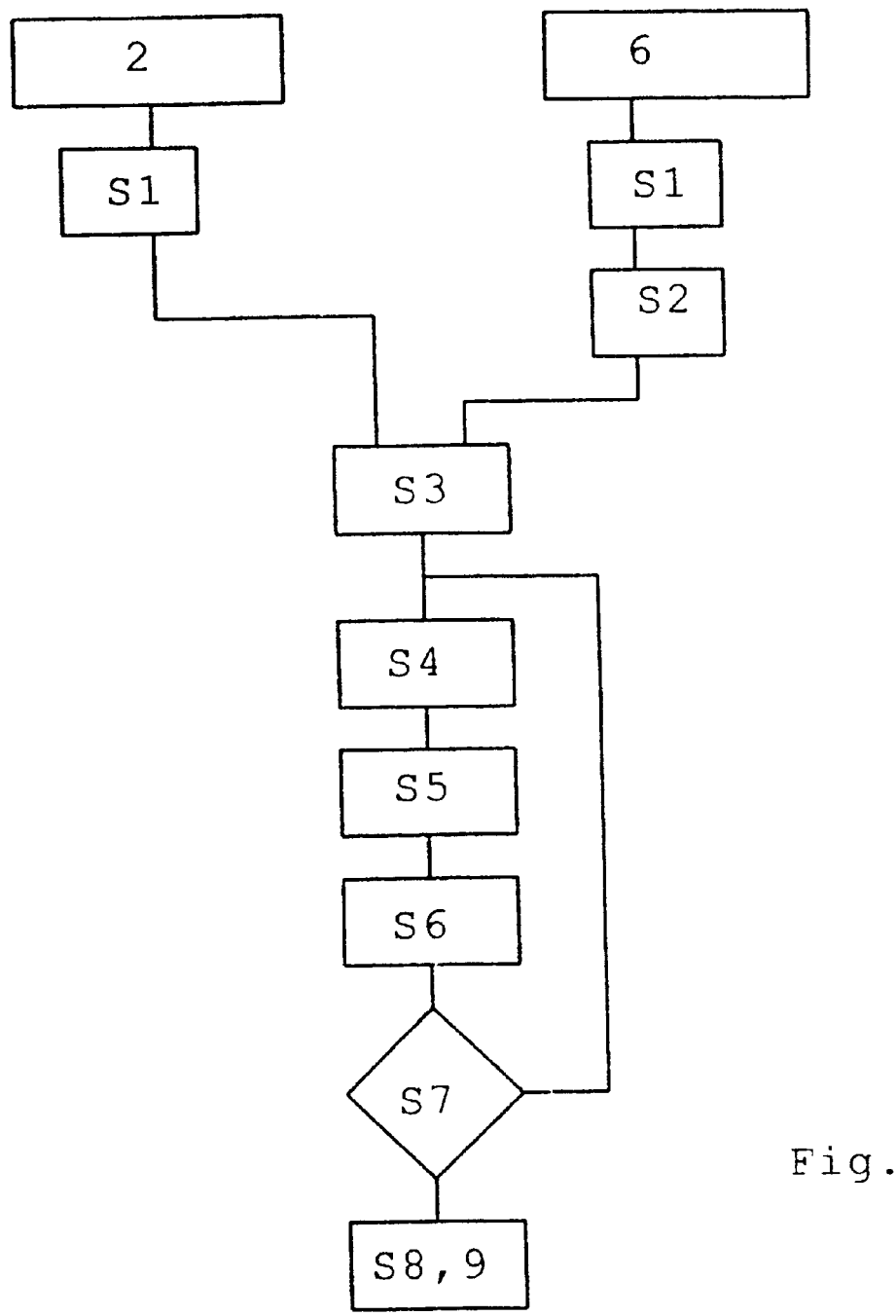
FIG. 3 is a schematic illustration of the preferred method according to the invention.

Referring to FIG. 3 the preferred method for combining two images is as follows:

S1. Thresholding to the lowest intensity limit defined by the user.

S2. Let the first of the two images serve as the reference image—image I. Then the other image—image II—is positioned in space according to the measured position data, if available.

S3. Establishment of a 3D uncertainty window whose size is defined by $\Delta x$, $\Delta y$ and $\Delta z$. The coordinates are relative to the origo of the receiving transducer in image I. $\Delta x$, $\Delta y$ and $\Delta z$ are determined on the basis of the quality position measurement system. If no such system is available it is defined by the maximum speed of the vehicle carrying the acoustic camera.

S4. Correct for lateral shift by convolution of the lateral projections.

S5. Correct for rotation 2D correlation of the lateral projections.

S6. Correct for distance by 2D correlation of the lateral projections.

S7. If high accuracy is required, repetition of the steps 4, 5 and 6 above.

S8. The neighbourhood of points in image I are checked for the presence of points from image II. All points are checked—above or below the intensity threshold.

S9. If such image II points are present in the neighbourhood, the maximum of their intensity is found an if it is higher than the intensity of the image I point, it replaces the intensity of the corresponding image I point.

The order of the steps, especially steps S4–S6, may be altered depending the specific use of the method.

When surveying an underwater object by using a plurality of overlapping images, the process is repeated by moving the transducer unit as smoothly as possible and obtaining new images partially overlapping the previous image. As increasing the number of overlapping images will reduce the noise in the resulting composite image, each new image is preferably partially overlapping more than one of the previous images.

As the angle and the distance of the measured objects relative to the transducer unit is known, the correlation between the succeeding image may provide an indication of the movements of the transducer unit. If the positions of the measured objects are known, the position and movement of the transducer unit may be found. However, the position and orientation of the transducer unit is preferably measured using a navigation system, e.g. using a GPS combined with a underwater positioning system. Thus the positions of the measured objects may be calculated.

By choosing the time interval the reflected waves are received, the method according to the invention may acquire images of objects within a corresponding range from the transducer or sensor unit. Thus, disturbances from objects close to or over a certain distance from the transducers may be eliminated. This may for example be used when inspecting a structure close to and in front of an oil platform. By receiving signals only within a chosen range the oil platform may be removed from the picture, thus leaving a simple image to be analysed.

According to one embodiment of the invention the position and orientation of the acoustic transducer unit is constant, controlling a chosen volume over time. Thus changes in the volume, such as occurrence of a diver, may be detected. By limiting the range in which the image is made, and thus removing the sea bottom or underwater structures, such changes are easily detected.

The distance range may be chosen individually for each angular segment providing a possibility to remove a structure protruding toward the transducers unit without affecting the range in other directions.

If the transducer unit is stationary the positions of the abovementioned common features in the images should not change. However, if changes are detected these changes may be analysed using known methods to provide an indication of the nature and extent of the change. By removing the static features in the volume using the technique described above only objects moving into the defined volume are detected.

The preferred acoustic camera or transducer unit is known per se from the abovementioned articles and is not to be described in detail here. It is, however, within the scope of this invention to use other acoustic cameras capable of three-dimensional imaging.

As is described in the articles the size of the angular sector from which the reflected signals are received may be chosen, e.g. by adjusting the acoustic frequency, as both the size of the volume and the resolution depends on the acoustic frequency relative to the size of said sensor matrix.

Also the possible side lobes of the acoustic transducers may be controlled by choosing the distance between the transducers depending on the frequency used in the measurements.

Thus the number of transducers and the size of the transducer array, as well as the frequency used, affect the measurements and may be chosen according to the specific use of the invention. The relationships between these parameters are well known in the related technical art.

The succeeding images may be measured using different frequencies, thus, if e.g. each third of the images are made over a relatively large angular sector and the rest of the images are made in a narrower volume a composite image may be made having a good resolution along a narrow portion of the image and a poor resolution over a wider angle. Thus two types of surveying may be made at the same time.

The acoustic source may be a single transducer or an array. Using a two-dimensional transducer array as a source the emitted beam may be shaped by differentiating the phase and emission time of each transducer.

In the preferred embodiment of the invention the source and the receiver array are separate transducers, preferably positioned in the same transducer or sensor unit. It is, however, within the scope of this invention to provide a transducer array being capable of both emitting and receiving the acoustic waves.

The calculations made according to the invention may be performed using software provided in computers positioned in the transducer unit or in another vessel. Necessary communication lines are provided, such as optical fibres, electrical conductors or acoustic or electro magnetical communication through the surrounding water.

The calculations may also be performed using hardware, e.g. by specialized microprocessors to obtain higher processing speed.

What is claimed is:

1. Method for producing an image of an underwater surface capable of reflecting acoustic waves, characterized in comprising the following steps:

a) emitting acoustic waves from a first transducer toward a first chosen volume, b) receiving acoustic waves reflected from said volume within two perpendicular angular sectors $\alpha_1$, and $\alpha_2$ relative to the receiver, said receiver including a two-dimensional array of acoustic sensors being capable of measuring the phase and amplitude of the received waves, c) from the measured phase and amplitudes calculating the direction of the reflected waves as defined within angular segments $\Delta\alpha_1$ and $\Delta\alpha_2$ included in the measured volume, d) detecting the maximum amplitude or amplitudes of the waves received from each angular segment and the time lapse from said emitting of the waves to the receipt of the maximum or maxima of each reflected wave, said time lapse thus indicating the distance to a reflecting object, the combination of directions of the reflected waves and distances providing a three-dimensional model of said volume, e) emitting acoustic waves toward a second volume at least partially overlapping said first volume, and repeating steps b)–d), f) detecting at least one common feature in the overlapping parts of the measured volumes and combining said models by adjusting the relative position(s) and size(s) of said feature(s) for generating a three-dimensional image based on the combination of said models.

2. Method according to claim 1, characterized in that said first transducer for emitting said acoustic waves and said sensor array for receiving said reflected waves are comprised in a sensor unit.

3. Method according to claim 2, characterized in moving said sensor unit between the generation of each image, and recording the change in the position or orientation of the transducer relative to the object.

4. Method according to claim 1, characterized in that said features are detected by analysing the images and detecting features with chosen characteristics.

5. Method according to claim 1, characterized in detecting the maximum values of said reflected waves within a chosen range of distances from said transducer by limiting the measuring time period.

6. Method according to claim 5, characterized in that the range of distances is chosen individually for each angular segment.

7. Method according to claim 1, characterized in that the first and second measured volumes are essentially identical.

8. Method according to claim 7, characterized in analysing the first and second images and detecting differences between said image for detecting movements or arrivals of new elements in the measured object.

9. Method according to claim 1, characterized in that the received acoustic beam is shaped using a number of receiver elements by controlling the received phase, frequency and amplitude received by each element.

10. Method according to claim 1, characterized in that the acoustic waves are emitted and received by the same transducer.

11. Method according to claim 3, wherein said change in the position or orientation of the transducer relative to the object is recorded using GPS and an underwater positioning system.

12. Method according to claim 4, wherein said chosen characteristics are minimum distances from the transducers.

* * * * *